Sept. 15, 1931.   C. R. BROWN ET AL   1,823,642
ARMATURE COMMUTATOR RESURFACING OR CUTTING MACHINE
Filed May 25, 1929    3 Sheets-Sheet 1
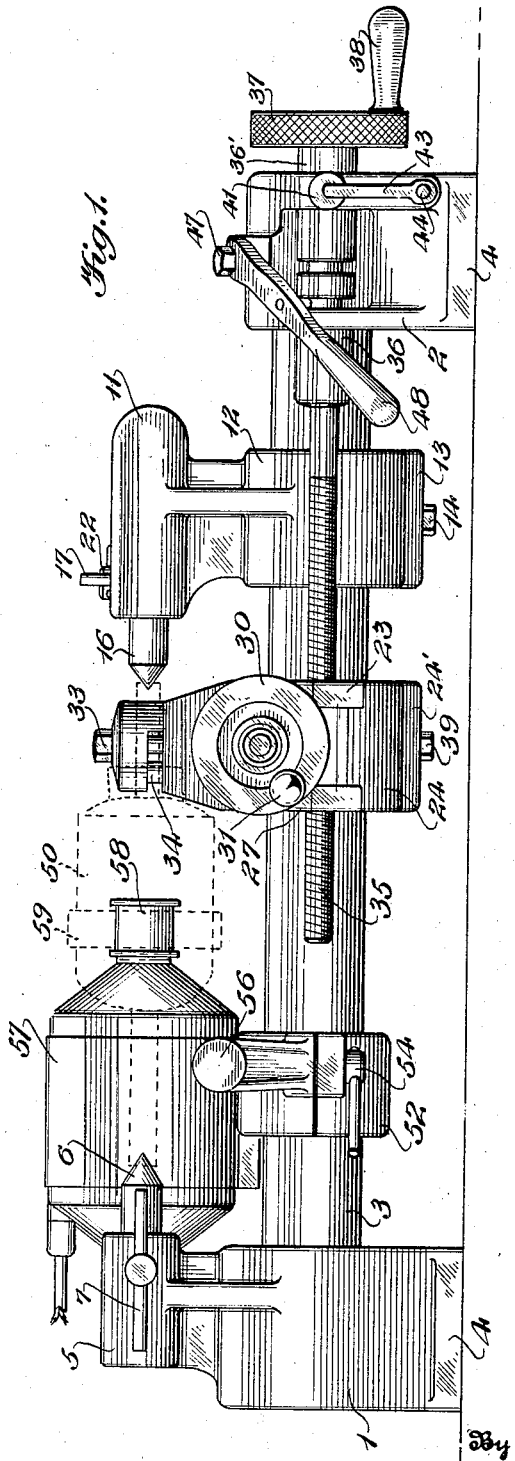
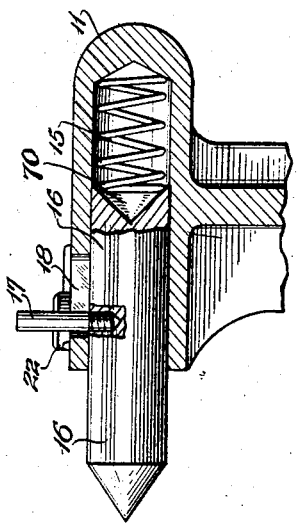
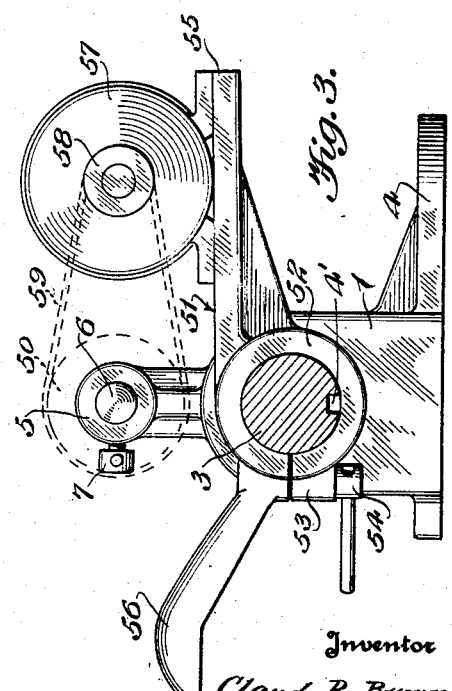
Inventor
Claud R. Brown,
and Jesse F. Thomas
By Linton, Kellogg & Smith
Attorneys

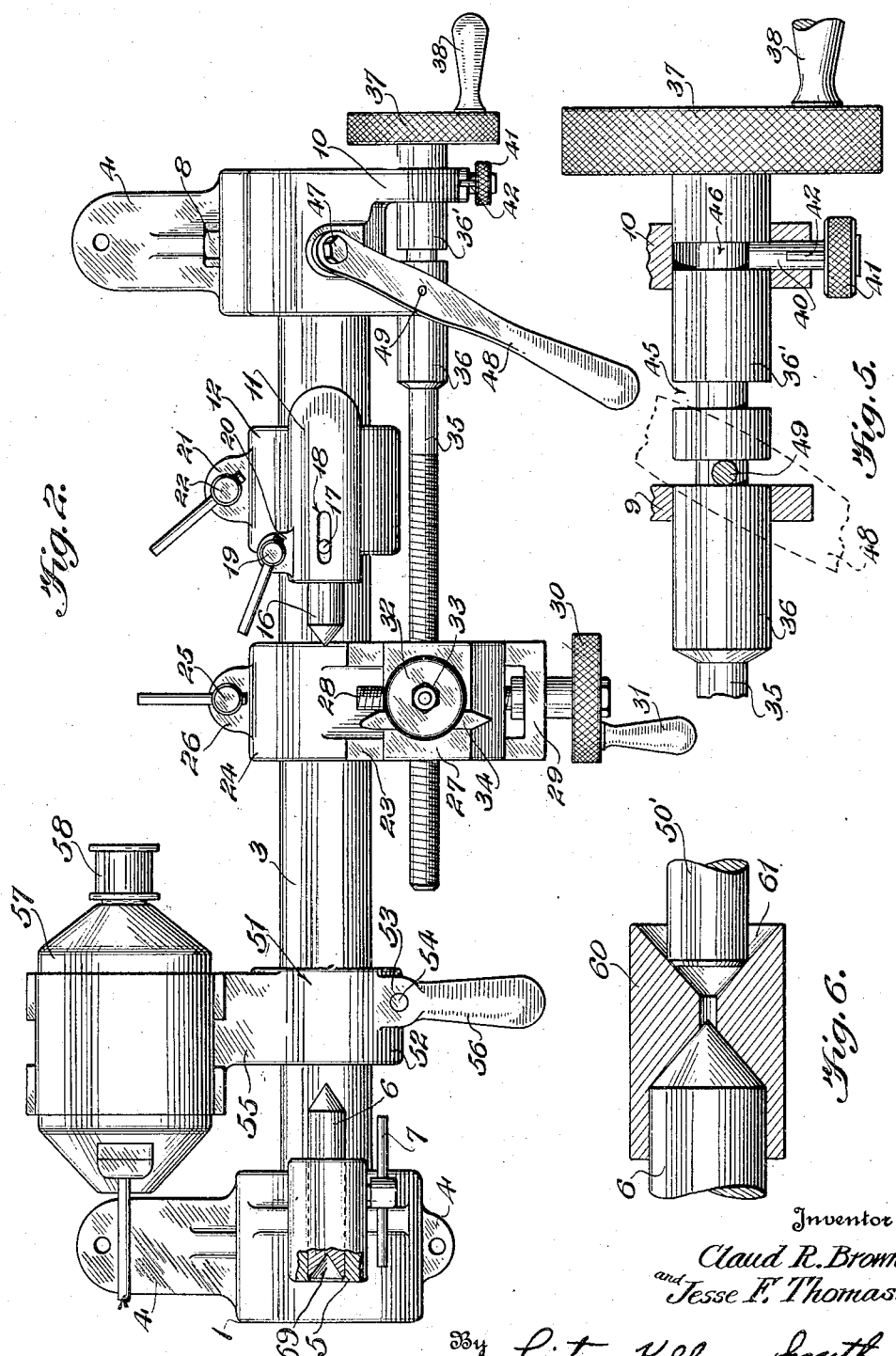

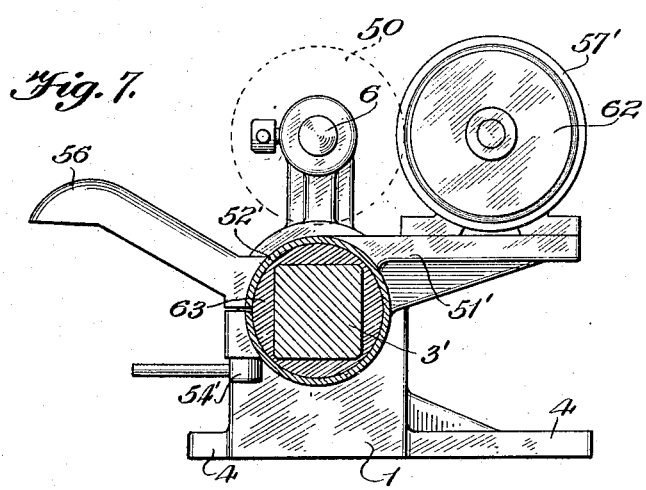
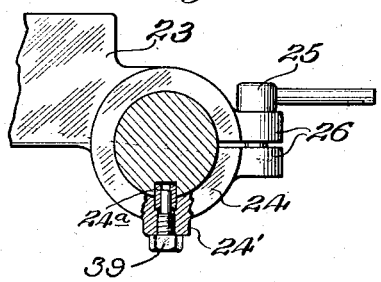
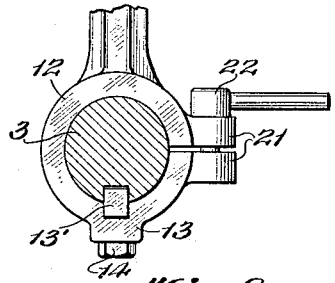
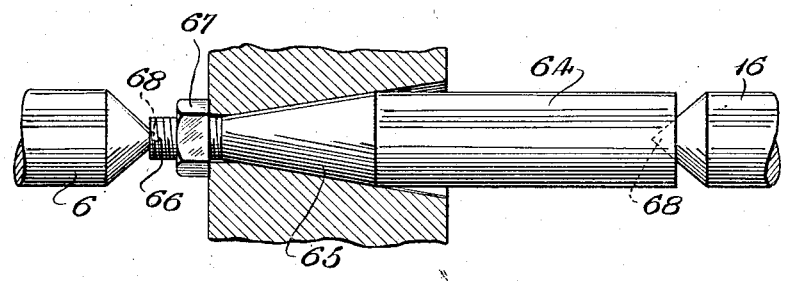

Patented Sept. 15, 1931

1,823,642

UNITED STATES PATENT OFFICE

CLAUD R. BROWN AND JESSE F. THOMAS, OF NEW LONDON, WISCONSIN

ARMATURE COMMUTATOR RESURFACING OR CUTTING MACHINE

Application filed May 25, 1929. Serial No. 365,983.

This invention relates to improvements in armature commutator resurfacing or cutting machines having for an object to provide a machine of comparatively small and inexpensive construction for cutting down or resurfacing the worn contact bearing portions of commutators of the armatures of electrical motors or dynamo electric machines, whereby the same may be caused to effectually function, the construction including means for rotatably supporting an armature to be worked upon and permitting the cutting tool employed, to be adjusted longitudinally and transversely so as to properly position the same with relation to the commutator to be resurfaced and to effect a rapid and accurate as well as uniform cutting thereof.

It is also an object of the invention to provide a machine of the character mentioned having means for moving the cutting tool in an undercutting operation for removing or stripping the insulating material from between the commutator segments during a resurfacing operation, such means being operable independently of the means for transmitting a longitudinal adjustment to the cutting tool carried, but being so connected to the same as to permit of the transmitting of a reciprocal motion thereto for this undercutting operation.

Another and equally important object of the invention may be stated to provide the motor, used for transmitting rotary motion to the armature being worked upon, with a novel form of mounting in order that the same may be longitudinally adjusted to proper position with respect to said armature and also, that the same may be swingably adjusted to effect proper driving contact between it and the armature for rotating the latter.

Yet another object of the invention may be stated to reside in the provision of adjustable stocks and centers for permitting the supporting of armatures of different sizes and designs upon the improved machine, thereby allowing for the resurfacing of their commutators and rendering the machine universally adaptable.

It is also an object of the invention to provide a machine for cutting down or resurfacing the commutators of armatures, wherein the head and tail stocks thereof are capable of relative adjustment as are the motor supports for transmitting rotary motion to the armature to be worked upon and the tool carriage, each of these elements, subsequently to adjustment to a proper operating position, being capable of being fixedly secured or locked in that position, whereby to positively prevent any subsequent movement of the same and consequently upon this, ensuring the accurate and efficient operation of the machine.

Other objects of the invention will be in part obvious and in part pointed out hereinafter.

In order that the invention and its mode of operation may be readily understood by persons skilled in the art, we have in the accompanying illustrative drawings, and in the detailed following description based thereon, set out several possible embodiments of the same.

In these drawings:

Figure 1 is a side elevation of the improved armature commutator resurfacing machine, Figure 2 is a top plan view thereof, Figure 3 is a vertical transverse section through the same, Figure 4 is an enlarged fragmentary detail in longitudinal section through the adjustable tail stock center, Figure 5 is a fragmentary detail, partly in section, illustrating the mounting of the combined tool carriage adjusting shaft and undercutter operating device, Figure 6 is a detail, partly in section, illustrating a type of spindle adapted to be used in connection with certain characters of armature shafts to the stock centers, Figure 7 is a vertical transverse section through a slightly modified form of the invention wherein a friction disk or gear is employed to effect driving connection between the armature body and the electric motor, Figure 8 is a detail in section illustrating the key connection of the tail stock to the bed rod of the machine, Figure 9 is a similar view illustrating the key connection of the tool carriage bracket to the bed rod of the machine, and Figure 10 is a detail in elevation, with a part shown in section, illustrating a type of adapter spindle for use in rotatably supporting certain types of armatures upon the machine for resurfacing.

Having more particular reference to the drawings, in connection with which like characters of reference will designate corresponding parts throughout, the improved machine may be stated to comprise front and back legs or bearing pillars 1 and 2 having a cross sectionally circular bed rod or support 3 non-rotatably mounted therebetween, the under or lower side of this support being formed throughout its length, with a suitable longitudinally disposed keyway. Each of the legs 1 and 2, as is usual are provided with feet 4 whereby to permit of effectual securing of the same to a receiving or supporting bed or body, while upon the normally upper side of the front leg 1, there is fixedly arranged a head stock 5 receiving in the pocket thereof, a slidably mounted center 6, hereinafter termed, the head stock center; said center being adapted to be fixedly secured in an adjusted position with respect to the head stock 5 through the medium of a screw threaded locking pin turned into engagement with said stock and carrying a handle 7 upon its outer or exposed end, whereby to facilitate rotation of the same. In this connection, it is to be noted that the arrangement of the head stock 5 and the center 6, is such that they are disposed directly above and coincidentally with the bed rock or support 3.

The back leg 2, as is shown in the Figure 2, is formed with a transversely split lower portion whereby the same may be clampingly engaged with the particular end of the bed rod 3 engaged therein and secured in such clamping engagement, through the medium of a locking bolt 8 turned into engagement with screw threaded openings formed in appropriate portions thereof. Also, laterally disposed bearing extensions 9 and 10 are formed integral with one side of the back leg 2 and serve for a purpose which will be subsequently described.

A tail stock indicated by the numeral 11 is provided the device, being formed with a cross sectionally circular bearing collar 12 having a transversely extending key receiving pocket or extension 13 provided in the lower portion thereof; the bearing collar 12 being snugly and slidably engaged over the bed rod 3, as is shown in the Figures 1 and 2 and furthermore, movably receiving a suitable key 13' within the pocket or extension 13, said key being adapted to be moved into and retained in engagement with the keyway of the rod 3 through the engagement of an adjusting and locking bolt 14 therewith, this bolt, as is shown in the Figure 1, being turned into engagement with a screw threaded opening formed through the pocket or extension 13 and having its free end engaged with the key. Thus, it will be undrestood that the collar 12 carrying the tail stock 11 is splined to the bed rod 3 and while it is capable of having longitudinal sliding movement over said rod, rotary movement of the same with respect thereto, will be prevented. At this point, it is to be noted that the tail stock 11 is disposed directly above the bed rod 3 and is positioned in true longitudinal alinement with respect to the head stock 5.

A pocket is formed in the tail stock 11, opening onto the normally inwardly disposed end thereof and serves to receive therein an expansible coiled spring 15, one end of which has bearing upon the bottom or inner end of said pocket while the opposite end thereof has bearing upon a tail stock center 16; the outward movement of said tail stock center 16 being limited with respect to the tail stock 11 through the medium of a stop pin 17 engaged in said center 16 and extending through a longitudinally disposed way or slot 18 formed in an appropriate portion of the stock. Also, it is to be noted, that the tail stock 11 is split longitudinally and is adapted to have clamping engagement with the tail stock center 16 through the medium of an adjusting or locking bolt 19, turned into engagement with screw threaded openings formed in relatively opposed ears 20 carried upon the opposite portions of said stock. Because of the provision of this clamping or adjusting bolt 19, it will be understood that the tail stock center 16 may be fixedly secured in any adjusted position with respect to the pocket of the tail stock. Furthermore, a similar locking means is provided the collar 12 of the tail stock; that is, said collar is formed with a transversely extending slit having bearing ears 21 formed upon the opposite portions thereof and provided with complemental screw threaded openings adapted to receive an adjusting or locking bolt 22 therethrough. Consequently upon this, it will be understood that the tail stock carrying collar 12 may be fixedly secured or positively locked in any of its adjusted positions upon or with respect to the bed rod 3.

Slidably mounted upon the bed rod 3 is a tool carriage 23, a portion of which is formed with a transversely slit bearing collar 24 adapted to be clampingly engaged, at times, with the bed rod 3 through the medium of an adjusting or locking bolt 25 engaged with complemental screw threaded openings 26 formed upon the opposite sides of the transversely slit portion of said collar and thus, affording an effectual means for locking or securing said tool carriage 23 in any of its adjusted positions upon the bed rod 3. Mounted for longitudinal sliding movement upon the upper side of the tool carriage 3 is a bed 27 having a screw threaded longitudinally disposed opening formed therethrough and into which a screw threaded adjusting shaft 28 is turned, the outer end of this shaft being rotatably mounted in a suitable bearing portion 29 formed upon the adjacent end of the carriage 23 and having a hand wheel 30 fixedly secured to the outer end of the same; a handle 31 being secured to the wheel 30, for an obvious purpose.

Arranged upon the longitudinally slidable bed 27, is a tool securing post, the upper end of which is screw threaded and is adapted to removably receive thereover, an offset tool holder 32, whereupon a locking or securing nut 33 is turned into engagement with said screw threaded portion of the post and, obviously, serves as a means for effecting a positive and clamping connection of the tool holder 33 with an appropriate or proper type or design of double ended cutting tool 34.

In order that longitudinal adjustment of the tool carriage 23 along the bed rod 3 may be effected by an operator of the machine, a transversely disposed screw threaded opening is formed in the lower and intermediate portion of the carriage and receives therethrough, a screw threaded adjusting or feed shaft 35, said shaft being arranged in parallelism to the bed rod 3 and having bearing portions 36 and 36' formed upon one end thereof and rotatably and slidably engaged in openings provided therefor in the aforesaid bearing extensions 9 and 10 of the back leg 2. A hand wheel 37 is fixedly mounted upon the outer and extended end of the screw threaded feed shaft 35 and is provided with an offset handle 38, for an obvious purpose. Thus, it will be understood that by rotating the feed shaft 35 in the bearing extensions 9 and 10 from the hand wheel 37 and its handle 38, a longitudinal adjusting movement of the tool carriage 23 along and over the bed rod 3 will be effected to that extent required. Furthermore, with a view toward preventing any possible rotative movement of the tool carriage 23 with respect to the bed rod 3, I provide within a portion of the transversely slit collar 24, a key receiving pocket or extension 24', movably engaging in said pocket or extension, a key 24ª and that key being adapted to be retained in slidable engagement with the key-way 4 of the bed rod 3 through the medium of an adjusting or locking screw or bolt 39 turned into engagement and through an appropriate screw threaded opening formed in the extension 24' as is shown in the Figure 1.

In addition to the rotative mounting of the screw threaded feed shaft 35 in the bearing extensions 9 and 10 of the back leg 2, it will be understood that said shaft is capable of a longitudinal sliding movement with respect to said bearing and to the bed rod 3. This sliding movement of the shaft is permitted by reason of the slidable reception of the enlarged bearing portions 36 and 36' of the feed shaft in the bearing openings provided therefor in said extensions 9 and 10. To normally secure the feed shaft 35 against this sliding movement in the bearing extensions 9 and 10 and with respect to the bed rod 3, I engage a stop or locking pin 40 through an appropriate opening formed in the outer side of the bearing extension 10, providing the outer end of said pin with a knurled head or finger piece 41 and with inwardly extending pins 42 adapted to be removably engaged in an opening or recess formed in an adjacent portion of said extension 10; said pin 40 being normally retained in its innermost or operative position through the medium of a leaf spring 43 having one end engaged with the outer side of the finger piece or head 41, while the opposite end thereof is secured, as at 44, to an appropriate portion of the back leg 2. The inner end of this pin 40 is adapted to be engaged in either of two circumferentially arranged ways 45 and 46, formed in relatively spaced portions of the enlarged bearing portion 36' of the feed shaft 35 and with this engagement in either of said ways, will serve as an effectual means for releasably securing or retaining the feed shaft 35 in either of its two limits of sliding movement.

To facilitate the transmission of sliding movement to the feed shaft 35, I pivotally mount, as at 47, upon a portion of the upper side of the back leg 2, a lever 48, mounting upon the intermediate portion of said lever, a finger 49 adapted to be engaged in that annular way provided between the adjacent ends of the enlarged bearing portions 36 and 36', as is well shown in the Figures 1 and 5. Thus, by rocking the lever 48 upon its pivot point 47, it will be seen that an inward or outward sliding movement of the feed shaft 35 with respect to the bed rod 3 may be effected and furthermore, that said feed shaft may be releasably secured at either end of the limits of its sliding movement, by the selective engagement of the spring pressed locking pin 40 in the particularly adjacent way 45 or 46. However, by reason of the engagement of the pin 40 and the finger 49 in the annular ways described in connection therewith, it will be seen that rotation of the feed shafts 35 will not in any way be interfered with. Consequently upon this combined rotative and slidable mounting of the feed shaft 35, it will be understood that with rotation of said shaft, a longitudinal adjusting movement of a minute character may be imparted to the tool carriage 23 and that with disengagement of the locking pin 40 from either of the ways 45 or 46, a free sliding movement of the feed shaft 35 together with the tool carriage 23 may be effected by rocking the operating lever 48.

It is desirable that means shall be provided the machine for transmitting rotary motion to an armature supported between the head and tail stock centers 6 and 16, as is shown in dotted lines and here indicated by the numeral 50. To this end, I provide a motor support, generally indicated by the numeral 51, said support consisting of a slit cross sectionally circular bearing collar 52 loosely engaged over the cross sectionally circular bed rod 3, as is shown in the Figure 3; bearing ears formed with complemental screw threaded openings and designated by the numeral 53 being formed upon the opposite portions of the slit collar 52 and receiving therein a locking or securing screw or bolt 53 whereby, when proper rotative adjustment or positioning of the collar 52 has been effected, the same may then be positively and fixedly secured in a non-rotative or non-shifting position with respect to the bed rod 3. Also, a supporting arm 55 is fixedly carried upon the slit collar 52 of the motor support 51 and is adapted to be disposed inwardly and transversely with respect to the bed shaft 3, while upon the opposite side of the collar 52, there is fixedly mounted, an outwardly extending and transversely disposed handle 56. An electrical motor is fixedly mounted or secured upon the supporting arm 55 of the support 51, being designated by the numeral 57 and the rotatable armature shaft of this motor carries a belt pully or spool 58 adapted to receive thereabout an endless driving belt, shown in dotted lines and designated by the numeral 59. The opposite end of this driving belt 59 is adapted to be engaged over and about the body of the armature 50 so that with energization of the fields of the motor 57, the following rotation of the armature shaft will be transmitted through the pulley 58 and the belt 59 to said armature 50, causing the same to rotate between the head and tail centers 6 and 16. In this connection, it is to be noted that proper driving connection between the pulley 58 of the motor 57 and the armature 50 through the endless belt 59 may be effected by the rotative adjustment of the motor support 51 upon the bed rod 3, subsequently to which, said support is adapted to be securely locked in its adjusted position by means of the locking bolt or screw 54; this rotative adjustment of the support 51 being facilitated by the provision of the handle 56. In addition to the rotative adjustment of the motor support 51 with respect to the bed rod 3, it will be also seen that said support is capable of adjustment longitudinally along or over the bed rod 3 by reason of the loose engagement of the bearing collar 52 over said bed rod.

The operation of our improved machine may be stated to be as follows:

Assuming that it is desired to resurface the commutator of an armature of an electrical motor or dynamo electric machine, the same is, of course, first removed from the machine and the size thereof is noted by the operator. At this time, if desired, relative adjustment or positioning of the tail stock 11 together with its slit collar 12 may be effected upon the bed rod 3 and when such adjustment has been secured, the tail stock 11 is locked in a fixed position with respect to the bed rod 3 by clampingly engaging the slit collar 12 with said bed rod through the medium of the locking or securing screw 22. At this time, it will be seen that the head stock and tail stock centers 6 and 16 will be arranged in true longitudinal alinement. The armature 50 is now brought to a position whereat one end of the shaft thereof may be engaged with the head stock center 6, after which the free end of the endless belt 59 is engaged over the armature body and the remaining end of the armature shaft is engaged with the tail stock center 16, such engagement being permitted without subsequent movement or adjustment of the tail stock 11, by reason of the spring mounting of said tail stock center 16, as heretofore described and as specifically illustrated in the Figure 5. The armature 50 is now rotatably supported between the head and tail stocks 5 and 11 and by reason of the respective mountings of the centers 6 and 16 in their particular stocks, it will be understood that accidental or undue displacement of the armature will be prevented. The motor support 51 is now adjusted longitudinally and rotatively with respect to the bed rod 3, until the proper positioning of said motor with respect to the armature is effected and until proper frictional contact has been established as between the endless belt 59, the pulley 58 of the motor 57 and the body of the armature 50. At this time, the motor support is locked in its adjusted position by clampingly engaging the slit collar 52 with the bed rod 3 through the medium of the locking or securing screw 54. If desired, the driving motor 57 may now be energized for transmitting rotary motion to the armature body 50.

With rotation of the armature body 50, it becomes desirable to effect proper adjustment and then proper engagement of the cutting tool 34 with the armature commutator. To effect this, first, the tool carriage 53 is adjusted longitudinally of the bed rod 3 to the proper operating position by rotating the screw threaded feed shaft 35 from its hand wheel 37 and the handle 38. Thus, a fine or minute longitudinal adjustment of said carriage 23 over and along the bed rod 3 will be effected to the desired point. With the effecting of this longitudinal adjustment of the tool carriage 23, the cutting tool 34 may be then engaged, to the desired extent, with the commutator of the now rotating armature 50 by rotating the screw threaded shaft 28 mounted in the bearing portion 29 of the carriage 23 and engaging through the screw threaded opening formed in the slidably mounted bed 27 on said carriage 23. With rotation of this shaft 28 in the proper direction, the bed 27 to which the cutting tool 34 is secured through the medium of the tool post and the offset tool holder 32, is moved toward and finally into engagement with the commutator, hence, permitting the proper cutting operation to be effected. As the cutting operation is in process, the cutting tool 34 may be moved longitudinally over the peripheral surface of the same by rotating the feed shaft 35 from the hand wheel 37 and its handle 38, thus bringing about an ultimate effectual resurfacing of the same. At times, during this cutting of the brass or other metal segments of the commutator of the armature 50, it becomes necessary to stop rotation of the armature body 50 and to remove or strip the insulating material from between the commutator segments. To effect this removal of the insulating material from between the commutator segments, the locking pin 40 is drawn outwardly from the particularly engaged annular way 45 or 46 formed in the enlarged bearing portion 36' and at this time, the lever 48 is rocked in a direction to cause the transmission of sliding movement to the tool carriage 23 together with a corresponding movement of the cutting tool 34, causing said cutting tool, which has been subsequently adjusted to the proper position, to engage the insulating material between the commutator segments and to undercut the same therefrom. With this undercutting of the insulation material from between the commutator segments to the proper extent, the resurfacing operation with concern to the commutator segments may be then further carried on, although it is to be understood that with a re-cutting of the commutator, the locking pin 40 is re-engaged with the particularly adjacent annular way or groove 45 or 46 of the bearing portion 36', so that with rotation of the feed shaft 35 from the hand wheel 37, the necessary minute longitudinal adjustment of the carriage 23 together with the cutting tool 34 may be effected with respect to the commutator of the armature 50.

In some types of electric motor or dynamo electric machine armatures, it will be understood by workers skilled in this art, that center receiving openings are not provided in the shafts thereof. To take care of such conditions and to permit of the effectual mounting of the types of armature shafts between the head and tail stocks of our improved machine, we may and preferably do, provide the several stock centers with spindles or sleeves such as indicated herein by the numeral 60 and especially, illustrated in the Figure 6. These spindles or sleeves 60, are, of course, constructed of the proper grade of steel and in one of their ends, a bearing portion is formed corresponding to the bearing portion of the stock centers, hence, permitting of a snug fitting engagement of the same thereover, while the opposite end of the spindle or sleeve is formed with a tapered bearing portion 61, the degree of which coincides with that of the bearing portion adapted to be engaged over the stock center and indicated for convenience herein by the numeral 6. Thus, with one of these spindles 60 engaged with the several stock centers, it will be understood that the opposite ends of the armature shaft 50' may be engaged in the tapered bearing portions 61 and thus effectually supported for rotative movement between the head and tail stocks of the machine.

Instead of transmitting rotary motion from the motor 57 to the armature body 50 by way of the endless belt gearing 59, I may, under certain conditions, provide a direct friction gear drive as between the electric motor and the armature body to be worked upon, as for example, according to the construction illustrated in the Figure 7. In this particular embodiment of the invention, the rotatable armature shaft of the motor 57' has a friction gear, of proper size, designated by the numeral 62, fixedly mounted thereon, so that with rotatable adjustment of the motor support 51' with respect to the bed rod of the machine, said gear 62 may be brought into rotatable driving contact with the armature body or some appropriate portion thereof, hence, permitting of the transmission of rotary motion to said armature body without the need of the belt gearing, heretofore described.

Also, if desired, the mounting of the motor support upon the bed shaft of the machine may be modified in accord with the disclosure as set forth in the Figure 7. In this particular embodiment of the invention, the bed rod 3' of the machine is formed substantially square or multi-sided in cross sectional shape and the motor support 51' is formed with a mounting bracket 52' having a circular inner peripheral or bearing surface and in which, a bushing or sleeve 63 is rotatably engaged; the outer peripheral surface of this bushing or sleeve being circular, while the inner surface of the same is substantially square or multi-sided in its cross sectional shape, corresponding to the cross sectional shape or formation of the bed rod 3'. Thus, it will be understood that the necessity of key-waying the bed rod 3', as is the case with the bed rod 3, will be eliminated and whereas the bushing 63 will be prevented from having rotative movement upon the bed rod 3', the motor support bracket 51' may be rotated over or about the cross sectionally circular outer peripheral surface of the said bushing; said bracket 51' being capable of being clampingly connected to the bushing, when the proper rotative positioning of the motor support has been secured, by means of turning the locking or securing screw 54' into clamping or binding engagement.

With modification of the motor mounting or support, as set forth in the Figure 7, it will be understood that the bearing collar 12 provided tail stock 11 will likewise be modified in its construction to accord with the construction suggested in the Figure 7 and pertaining to the racket 52'; also, that the bearing collar 24 of the tool carriage 23 will be similarly modified in its construction to accord with that of said bracket 52' having the bushing or sleeve 63 received or mounted therein and provided with a cross sectionally squared opening therethrough for snug and slidable engagement over the bed rod 3'.

While we have hereinbefore described with some degree of particularity, and especially, with reference to the Figure 6, a spindle construction for permitting of the mounting of armatures whose shafts are not formed with stock center receiving openings, it will be well understood by workers skilled in this art, that other types or designs of armatures are provided with hollow shafts. To permit of the effectual rotatable mounting of armatures equipped with hollow shafts between the head and tail stock centers of our improved machine, we preferably provide an adapted spindle, such as is illustrated in the Figure 10. This adapter spindle consists of a single piece of metal, designated by the numeral 64, one end of which is tapered as at 65 and formed with screw threads 66 whereby to permit of the turning of a jam or lock nut 67 thereonto. The opposite extremities of this spindle 64 are provided with the stock center receiving openings or pockets, as indicated by the numeral 68. In using this adapter spindle, the same is driven or passed through the hollow armature shaft and in so passing the spindle therethrough, it will be understood that a portion of the hollow shaft will have binding engagement with the tapered portion 65 of said spindle, whereupon the jam nut 67 is turned into engagement with the reduced and screw threaded extremity 66, binding upon the adjacent portion of the hollow armature shaft and serving to effect a fixed connection as between said spindle and the armature shaft. The assembly, so described, is now placed or mounted between the head and tail stock centers 6 and 16, in the manner hereinbefore described, whereupon the repair or resurfacing and undercutting of the armature commutator may be effected.

At this time, attention is invited to the particular formation of the head and tail stock centers 6 and 16, illustrated in the Figures 2 and 4. Each of these stock centers, and as especially shown in the said Figures 2 and 4, are formed in their normally outer ends, with tapered recess receiving pockets or recesses, such as indicated by the numerals 69 and 70, hence, permitting of reversal of said centers, under certain working conditions, whereby the spindle receiving pockets 69 and 70 may be used as the means for receiving the bearing spindles of an armature or other device to be ground therein, particularly, in the fashion as is shown in the Figure 6. Obviously, by forming these tapered spindle receiving pockets in certain of the ends of the head and tail stock centers, the need for a spindle such as hereinbefore identified by the numeral 60 in the Figure 6, will be obviated, under certain working conditions. Also, due to the removable mounting of the stock centers 6 and 16 in their respective head and tail stocks, it will be appreciated that the same may be readily removed and reversed in their relative positioning.

Manifestly, the construction shown is capable of considerable modification, and such modification as is within the scope of our claims we consider within the spirit of our invention.

We claim:

1. A machine of the character described, comprising a supporting means, pillars receiving and supporting said means adjacent the opposite ends thereof, a tool carriage slidably mounted upon the supporting means, a tool post bed mounted for sliding movement longitudinally of the carriage at substantially right angles to the supporting means, stocks on the supporting means, one of which is adjustable towards and away from the other, a shaft disposed parallel to the supporting means having screw threaded engagement with a portion of the tool carriage, rotatably and slidably mounted at one end upon one of said pillars, means on the shaft for facilitating manual rotatable adjustment thereof, a lever mounted on the last mentioned pillar engaging with the shaft for imparting sliding movement to the same in a path parallel to the supporting means, that portion of said shaft mounted in said last mentioned pillar having relatively longitudinally spaced annular ways formed therein, and movable locking means mounted on said last mentioned pillar selectively engageable in either one of said ways formed upon the shaft for securing the same against sliding movement under influence of said lever.

2. A machine of the character described, comprising a supporting means, a tool carriage slidably mounted upon the same, a tool post bed adjustably mounted on the carriage, stocks on the supporting means, one of which is adjustable towards and away from the other, a shaft disposed longitudinally of the supporting means having operative engagement with a portion of the tool carriage, rotatably and slidably mounted at one end upon a portion of the supporting means, a lever mounted on said last mentioned portion of the supporting means engaging with the shaft for imparting sliding movement to the same in a path parallel to the supporting means, that portion of said shaft mounted in said last mentioned portion of the supporting means having relatively longitudinally spaced annular ways formed therein and movable locking means mounted on said last mentioned pillar selectively engageable with either one of said ways formed upon the shaft for securing the same against sliding movement under influence of said lever.

In witness whereof we have hereunto set our hands.

CLAUD R. BROWN.
JESSE F. THOMAS.